(12) United States Patent
Irie et al.

(10) Patent No.: US 10,703,364 B2
(45) Date of Patent: Jul. 7, 2020

(54) VEHICLE CONTROL SYSTEM

(71) Applicants: TOYOTA JIDOSHA KABUSHIKI KAISHA, Toyota-shi, Aichi-ken (JP); DENSO CORPORATION, Kariya, Aichi-pref (JP)

(72) Inventors: Ryo Irie, Okazaki (JP); Masateru Amano, Shizuoka-ken (JP); Hisaya Akatsuka, Kariya (JP)

(73) Assignees: TOYOTA JIDOSHA KABUSHIKI KAISHA, Toyota-shi, Aichi-ken (JP); DENSO CORPORATION, Kariya, Aichi-ken (JP)

( * ) Notice: Subject to any disclaimer, the term of this patent is extended or adjusted under 35 U.S.C. 154(b) by 0 days.

(21) Appl. No.: 16/216,002

(22) Filed: Dec. 11, 2018

(65) Prior Publication Data
US 2019/0193731 A1 Jun. 27, 2019

(30) Foreign Application Priority Data
Dec. 25, 2017 (JP) .................. 2017-248175

(51) Int. Cl.
*B60W 30/12* (2020.01)
*B60W 50/14* (2020.01)
*B62D 1/28* (2006.01)
*G08G 1/16* (2006.01)
*B62D 15/02* (2006.01)

(52) U.S. Cl.
CPC ............ *B60W 30/12* (2013.01); *B60W 50/14* (2013.01); *B62D 1/286* (2013.01); *B62D 15/025* (2013.01); *G08G 1/167* (2013.01); *B60W 2050/143* (2013.01); *B60W 2540/18* (2013.01)

(58) Field of Classification Search
CPC ................. B60W 30/12; B60W 50/14; B60W 2050/143; B60W 2540/18; B62D 15/025; B62D 1/286; G08G 1/167
USPC .......................................................... 701/41
See application file for complete search history.

(56) References Cited

U.S. PATENT DOCUMENTS

| | | | | |
|---|---|---|---|---|
| 5,961,559 A * | 10/1999 | Shimbara | ............... | B60L 7/006 701/23 |
| 6,493,614 B1 * | 12/2002 | Jung | .................... | G05D 1/0246 180/168 |
| 9,423,498 B1 * | 8/2016 | Brown | ..................... | G08G 1/16 |
| 2004/0098197 A1 | 5/2004 | Matsumoto et al. | | |

FOREIGN PATENT DOCUMENTS

| JP | 2004-168192 A | 6/2004 |
|---|---|---|
| JP | 2015-141560 A | 8/2015 |

* cited by examiner

*Primary Examiner* — Muhammad Shafi
(74) *Attorney, Agent, or Firm* — Sughrue Mion, PLLC (57) ABSTRACT

A vehicle control system that executes path-following control includes a controller. The vehicle control system is configured to determine whether or not the path-following control is to be continued based on whether or not a coordinate point with current lateral deviation speed and lateral deviation as an X coordinate and a Y coordinate, respectively, falls within an ellipse to be specified on an X-Y plane with a time as a parameter, a value of a cosine function to be obtained by time-differentiating a function of an allowable limit sine wave on an X axis, and a value of the function of the allowable limit sine wave on a Y axis.

8 Claims, 8 Drawing Sheets

VEHICLE CONTROL SYSTEM

INCORPORATION BY REFERENCE

The disclosure of Japanese Patent Application No. 2017-248175 filed on Dec. 25, 2017 including the specification, drawings and abstract is incorporated herein by reference in its entirety.

BACKGROUND

1. Technical Field

The present disclosure relates to a vehicle control system, and in particular, to a vehicle control system that executes path-following control for controlling traveling of a vehicle to follow a target path.

2. Description of Related Art

Japanese Unexamined Patent Application Publication No. 2004-168192 (JP 2004-168192 A) discloses a lane departure prevention device. In the lane departure prevention device, a future lateral displacement is estimated using a yaw angle of a host vehicle with respect to a traveling lane, a lateral displacement (lateral deviation) from the center of the traveling lane, a curvature of the traveling lane, and a vehicle speed. Then, when the estimated lateral displacement (estimated deviation value) is equal to or greater than a predetermined lateral displacement limit value, determination is made that the host vehicle is likely to deviate from the traveling lane.

SUMMARY

A vehicle control system that executes path-following control for controlling a vehicle to follow a target path is known. In the vehicle control system described above, for example, a system limit due to a restriction on hardware of the vehicle control system is reached, and as a result, a vehicle behavior may be significantly staggered centering on a target path within a traveling lane compared to a vehicle behavior converging on the target path during a normal time. In the case described above, since the path-following control is hardly continued, there is a need to appropriately hand over an operation of the vehicle undertaken by the system to a driver. Then, to this end, appropriate determination on whether or not the path-following control is to be continued is requested.

Accordingly, it is considered that a technique relating to lane departure determination described in JP 2004-168192 A is used in determination on whether or not the path-following control is to be continued. However, in the technique described in JP 2004-168192 A, a lateral displacement amount is estimated based on a vehicle speed at the time of the determination for use in determination of a possibility of lane departure. When the method described above is used, even though staggering of the vehicle behavior is actually forced to be converged with the continuation of the path-following control, determination is made that there is a possibility of lane departure, and erroneous determination may be made that the path-following control should be interrupted.

The disclosure provides a vehicle control system capable of determining whether or not path-following control for controlling a vehicle to follow a target path is to be continued while more accurately distinguishing between when staggering of a vehicle behavior is actually forced to be converged with the path-following control and when a system limit is reached.

An aspect of the disclosure relates to a vehicle control system that executes path-following control for controlling traveling of a vehicle to follow a target path. The vehicle control system includes a controller. The controller is configured to determine whether or not the path-following control is to be continued based on, when a time differentiation value (temporal differentiation value) of a lateral deviation of the vehicle with respect to the target path is referred to as a lateral deviation speed, an allowable upper limit lateral deviation of the lateral deviation during the path-following control is set as amplitude, and a sine wave with an allowable upper limit frequency of a traveling trajectory of the vehicle during the path-following control is referred to as an allowable limit sine wave, whether or not the lateral deviation speed when the vehicle intersects the target path falls within a speed range to be defined by a maximum value and a minimum value of a cosine function to be obtained by time-differentiating a function of the allowable limit sine wave, or whether or not a coordinate point with the current lateral deviation speed and lateral deviation as an X coordinate and a Y coordinate, respectively, falls within an ellipse to be specified on an X-Y plane with a time as a parameter, a value of the cosine function on an X axis, and a value of the function of the allowable limit sine wave on a Y axis.

In the vehicle control system according to the aspect of the disclosure, the controller may be configured to, when the lateral deviation speed when the vehicle intersects the target path is out of the speed range or when the coordinate point is out of the ellipse, execute alarm processing for prompting a driver to perform an operation of the vehicle.

In the vehicle control system according to the aspect of the disclosure, the allowable upper limit lateral deviation may be smaller when alarm sensitivity of the alarm processing is high than when the alarm sensitivity is low. The alarm sensitivity may be requested by the driver.

In the vehicle control system according to the aspect of the disclosure, the allowable upper limit frequency may be lower when the alarm sensitivity of the alarm processing is high than when the alarm sensitivity is low. The alarm sensitivity may be requested by the driver.

In the vehicle control system according to the aspect of the disclosure, the allowable upper limit lateral deviation may be greater when a curvature of the target path is large than when the curvature is small.

In the vehicle control system according to the aspect of the disclosure, the allowable upper limit frequency may be greater when a curvature of the target path is large than when the curvature is small.

In the vehicle control system according to the aspect of the disclosure, the allowable upper limit lateral deviation may be constant regardless of a vehicle speed of the vehicle.

In the vehicle control system according to the aspect of the disclosure, the allowable upper limit frequency may be higher when a vehicle speed of the vehicle is high than when the vehicle speed is low.

According to the aspect of the disclosure, determination on whether or not the path-following control is to be continued is made based on whether or not the lateral deviation speed when the vehicle intersects the target path falls within the speed range to be defined by the maximum value and the minimum value of the cosine function to be obtained by time-differentiating the function of the allowable limit sine wave or whether or not the coordinate point with the current lateral deviation speed and lateral deviation as the X coordinate and the Y coordinate, respectively, falls within the ellipse to be specified on the X-Y plane with the time as a parameter, the value of the cosine function on the X axis, and the value of the function of the allowable limit sine wave on the Y axis. According to the determination method described above, it is possible to determine whether or not a vehicle behavior is within an allowable limit of a staggering behavior to be defined by the sine wave. According to the determination method of the disclosure, even though expansion of the lateral deviation is detected, insofar as a result of the determination is affirmative, it is possible to determine that the vehicle follows a sine wave-shaped traveling trajectory and the lateral deviation turns to decline in the future because the vehicle behavior is within the allowable limit of the staggering behavior. For this reason, according to the aspect of the disclosure, it is possible to determine whether or not the path-following control is to be continued while more accurately distinguishing between when staggering of a vehicle behavior is actually forced to be converged with the path-following control and when a system limit is reached.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is a diagram illustrating an ellipse for use in system limit determination processing;

FIG. 10A is a graph showing an example of the relationship between a correction amount of amplitude $A_{LMT}$ and a curvature of a target path TP;

FIG. 10B is a graph showing an example of the relationship between a correction amount of a frequency $f_{LMT}$ and the curvature of the target path TP;

FIG. 11A is a graph showing an example of the relationship between the correction amount of the amplitude $A_{LMT}$ and a vehicle speed of a host vehicle;

FIG. 11B is a graph showing an example of the relationship between the correction amount of the frequency $f_{LMT}$ and the vehicle speed of the host vehicle;

FIG. 12A is a graph showing an example of the relationship between the correction amount of the amplitude $A_{LMT}$ and alarm sensitivity;

FIG. 12B is a graph showing an example of the relationship between the correction amount of the frequency $f_{LMT}$ and the alarm sensitivity.

DETAILED DESCRIPTION OF EMBODIMENTS

Hereinafter, embodiments of the disclosure will be described referring to the drawings. However, the common elements in the drawings are represented by the same reference numerals, and overlapping description will be omitted. It is to be understood that, in a case where number, such as the number of pieces of each element, numerical quantity, amount, and range, are mentioned in the following embodiments, the disclosure is not limited to the numbers mentioned, except for a case where the numbers are particularly clearly specified or apparently specified in principle. The structure, steps, and the like described in the following embodiments are not necessarily essential to the disclosure, except for a case where the structure, steps, and the like are particularly clearly specified or apparently specified in principle.

Embodiment 1

Embodiment 1 of the disclosure will be described referring to FIGS. 1 to 12B.

1. Configuration Example of Vehicle Control System

Figure 1:
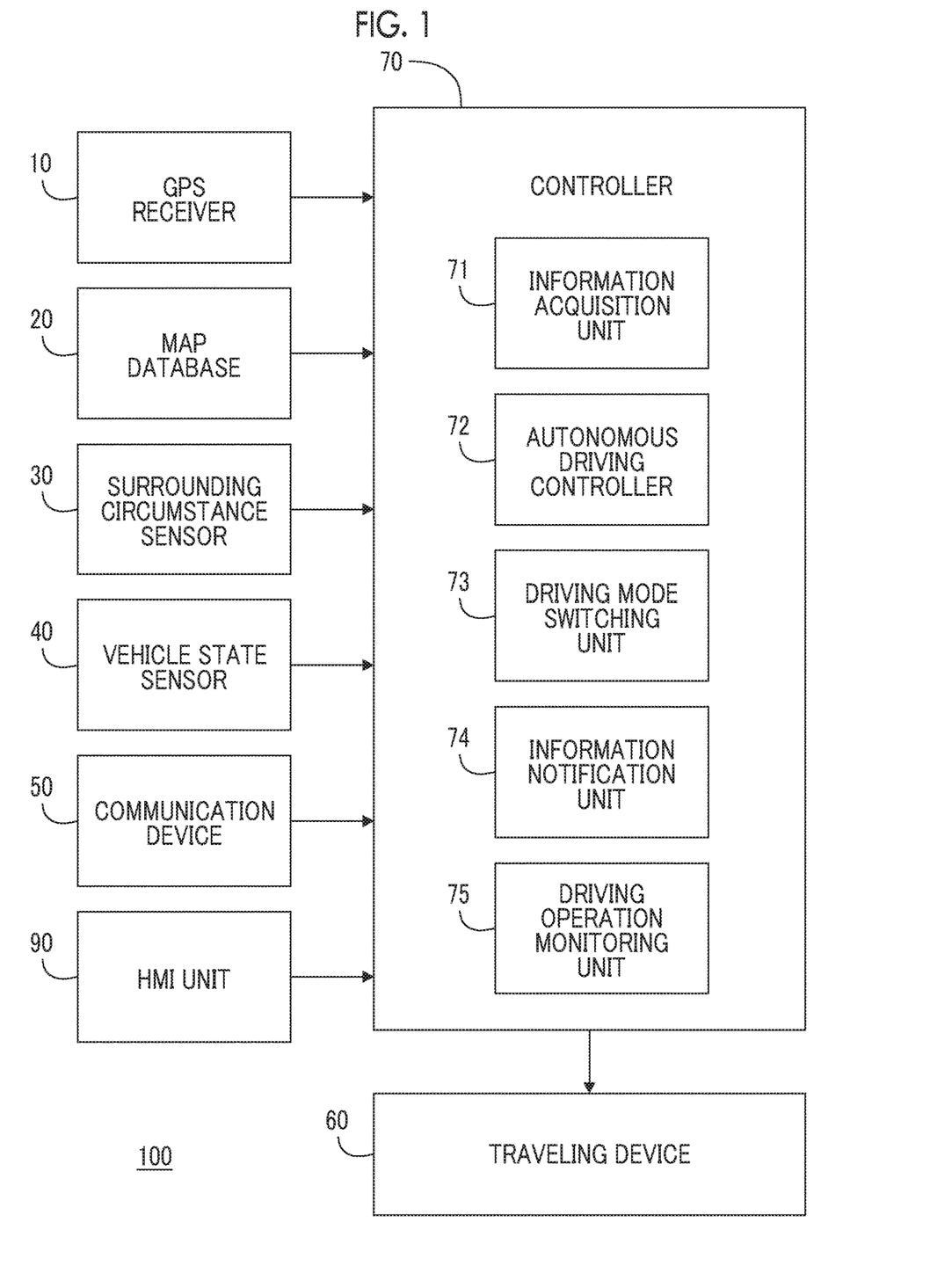
FIG. 1 is a block diagram showing a configuration example of a vehicle control system according to Embodiment 1.

FIG. 1 is a block diagram showing a configuration example of a vehicle control system 100 according to Embodiment 1 of the disclosure. The vehicle control system 100 according to Embodiment 1 is an autonomous driving system that is mounted in a vehicle 1 (see FIG. 4) and controls autonomous driving of the vehicle 1. In more detail, the vehicle 1 has, as a driving mode, a manual driving mode and an autonomous driving mode. In the manual driving mode, a driver becomes a subject of driving of the vehicle 1 and an operation of the vehicle 1 is performed. In the autonomous driving mode, the vehicle control system 100 becomes a subject of driving of the vehicle 1.

The vehicle control system 100 includes a global positioning system (GPS) receiver 10, a map database 20, a surrounding circumstance sensor 30, a vehicle state sensor 40, a communication device 50, a traveling device 60, and a controller 70.

The GPS receiver 10 receives signals to be transmitted from a plurality of GPS satellites and calculates a position and an azimuth of the vehicle 1 based on the received signals. The GPS receiver 10 sends the calculated information to the controller 70.

In the map database 20, information indicating a boundary position of each lane on a map is recorded in advance. The boundary position of each lane is represented by a dot group or a line group. The map database 20 is stored in a predetermined storage device.

The surrounding circumstance sensor 30 detects circumstance around the vehicle 1. As the surrounding circumstance sensor 30, laser imaging detection and ranging (LIDAR), a radar, a camera, or the like is exemplified. The lidar detects an object around the vehicle 1 using light. The radar detects an object around the vehicle 1 using an electric wave. The camera captures images of circumstances around the vehicle 1. The surrounding circumstance sensor 30 sends the detected information to the controller 70.

The vehicle state sensor 40 detects a traveling state of the vehicle 1. As the vehicle state sensor 40, a vehicle speed sensor, a steering angle sensor, a yaw rate sensor, a lateral acceleration sensor, or the like is exemplified. The vehicle speed sensor detects a speed of the vehicle 1. The steering angle sensor detects a steering angle of the vehicle 1. The yaw rate sensor detects a yaw rate of the vehicle 1. The lateral acceleration sensor detects a lateral acceleration that is applied to the vehicle 1. The vehicle state sensor 40 sends the detected information to the controller 70.

The communication device 50 performs vehicle-to-everything (V2X) communication (inter-vehicle communication and road-to-vehicle communication). Specifically, the communication device 50 performs vehicle-to-vehicle (V2V) communication (inter-vehicle communication) with other vehicles. The communication device 50 performs vehicle-to-infrastructure (V2I) communication (road-to-vehicle communication) with an ambient infrastructure. The communication device 50 can acquire information relating to an environment around the vehicle 1 through the V2X communication. The communication device 50 sends the acquired information to the controller 70.

The traveling device 60 includes a steering device, a drive device, a braking device, a transmission, and the like. The steering device is a device that steers wheels, and includes a steering wheel that is used for steering by the driver. The drive device is a power source that generates drive power, and includes an accelerator pedal that is used for adjustment of drive power by the driver. As the drive device, an engine or an electric motor is exemplified. The braking device is a device that generates braking force, and includes a brake pedal that is used for adjustment of braking force by the driver.

The controller 70 controls autonomous driving of the vehicle 1. Typically, the controller 70 is a microcomputer including a processor, a storage device, and an input/output interface. The controller 70 is hereinafter referred to as an "electronic control unit (ECU)". The controller 70 receives various kinds of information through the input/output interface. Then, the controller 70 controls autonomous driving based on the received information. The vehicle 1 is also provided with a human machine interface (HMI) unit 90. The HMI unit 90 is an interface for performing output and input of information between the driver and the controller 70. The HMI unit 90 includes an input device, a display device, a speaker, and a microphone. As the input device, a touch panel, a keyboard, a switch, or a button is exemplified.

In more detail, the controller 70 includes, as functional blocks, an information acquisition unit 71, an autonomous driving controller 72, a driving mode switching unit 73, an information notification unit 74, and a driving operation monitoring unit 75. The functional blocks are realized by the processor of the controller 70 executing a control program stored in the storage device. The control program may be stored in a computer readable recording medium.

The information acquisition unit 71 executes information acquisition processing. The autonomous driving controller 72 executes autonomous driving control processing. In the vehicle 1, the driver is able to alternatively select the autonomous driving mode and the manual driving mode using the HMI unit 90. The driving mode switching unit 73 switches the driving mode according to an operation result of the HMI unit 90 by the driver.

The information notification unit 74 notifies the driver of a state of the autonomous driving control notified from the autonomous driving controller 72 through the HMI unit 90. The notification to the driver is performed, for example, by text information, an image, voice, or sound effect. Furthermore, in the vehicle 1, when switching (a handover of an operation of the vehicle 1 to the driver) from the autonomous driving mode to the manual driving mode is performed based on the determination of the autonomous driving controller 72, the driver is able to adjust sensitivity of an alarm through alarm processing described below using the HMI unit 90. The alarm processing is executed by the information notification unit 74.

The driving operation monitoring unit 75 monitors operation states of the steering wheel, the accelerator pedal, and the brake pedal, and monitors whether or not the driver is operating these instruments. Specifically, the driving operation monitoring unit 75 monitors a steering angle, steering torque, and whether or not the driver touches the steering wheel in terms of the steering wheel, and monitors a depression amount of each pedal in terms of the accelerator pedal and the brake pedal.

Figure 2:
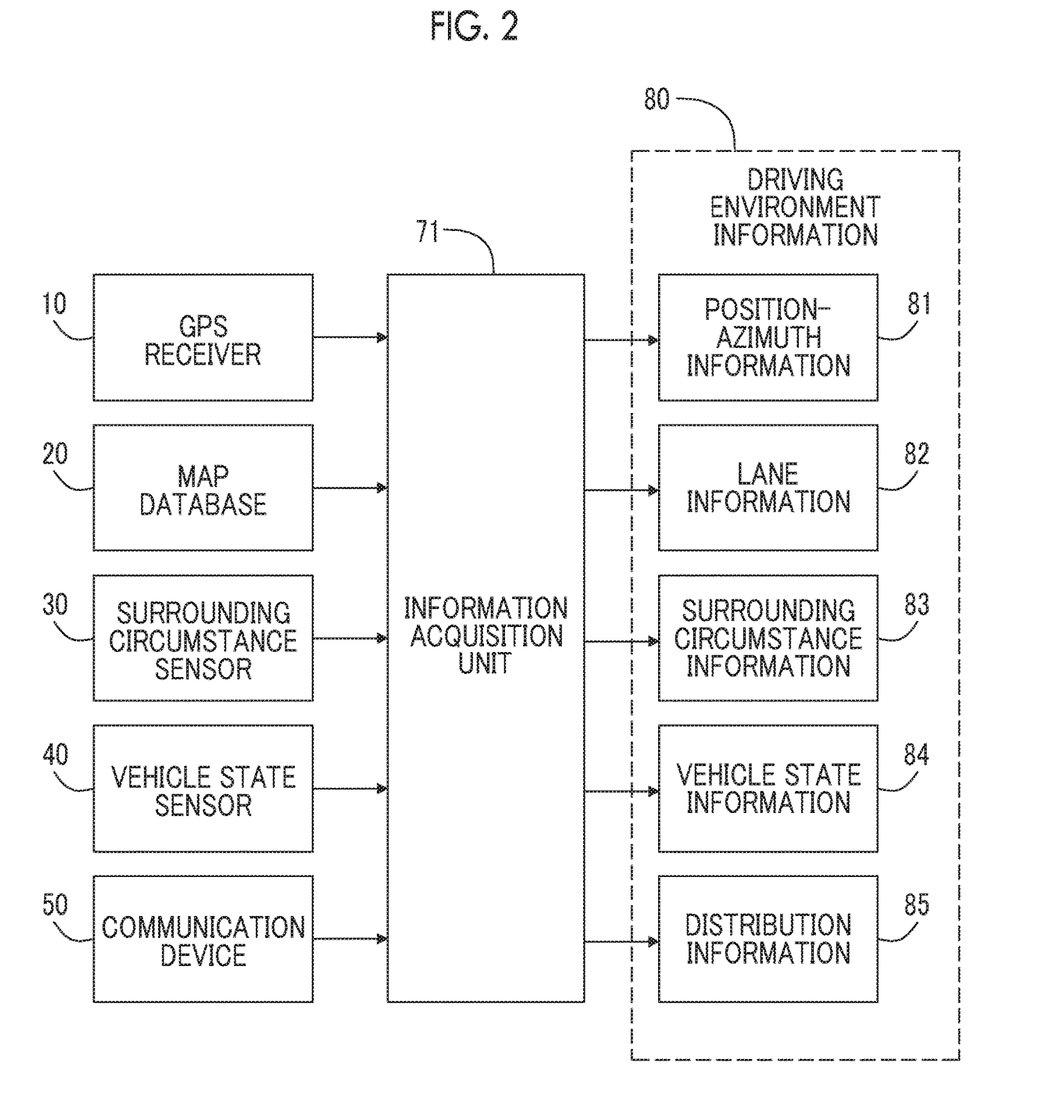
FIG. 2 is a block diagram illustrating information acquisition processing according to Embodiment 1.

FIG. 2 is a block diagram illustrating the information acquisition processing according to Embodiment 1. In the information acquisition processing, the information acquisition unit 71 acquires information needed for the autonomous driving control. Note that the information acquisition processing is executed repeatedly in each given cycle.

In more detail, the information acquisition unit 71 acquires position-azimuth information 81 indicating current position and azimuth of the vehicle 1 from the GPS receiver 10.

The information acquisition unit 71 reads information relating to a traveling lane (lane) from the map database 20 and generates lane information 82. The lane information 82 includes the arrangement (position, shape, and gradient) of each lane on a map. The information acquisition unit 71 can ascertain confluence, branching, intersection, and the like of lanes based on the lane information 82. Furthermore, the information acquisition unit 71 can calculate a lane curvature, a lane width, and the like based on the lane information 82.

The information acquisition unit 71 generates surrounding circumstance information 83 based on information detected by the surrounding circumstance sensor 30. The surrounding circumstance information 83 includes object information relating to objects around the vehicle 1. As the objects, white lines, roadside objects, surrounding vehicles, or the like are exemplified.

The information acquisition unit 71 generates vehicle state information 84 based on information detected by the vehicle state sensor 40. The vehicle state information 84 includes information regarding a speed, a steering angle, a yaw rate, a lateral acceleration, and the like of the vehicle 1.

The information acquisition unit 71 receives distribution information 85 through communication with the communication device 50. The distribution information 85 is information that is distributed from infrastructures or surrounding vehicles. As the distribution information 85, construction site information, accident information, or the like is exemplified.

All of the position-azimuth information 81, the lane information 82, the surrounding circumstance information 83, the vehicle state information 84, and the distribution information 85 indicate a driving environment of the vehicle 1. Information indicating the driving environment of the vehicle 1 described above is hereinafter referred to as "driving environment information 80". That is, the driving environment information 80 includes the position-azimuth information 81, the lane information 82, the surrounding circumstance information 83, the vehicle state information 84, and the distribution information 85. As described above, it can be said that the information acquisition unit 71 of the controller 70 has a function of acquiring the driving environment information 80.

2. Path-Following Control

Figure 3:
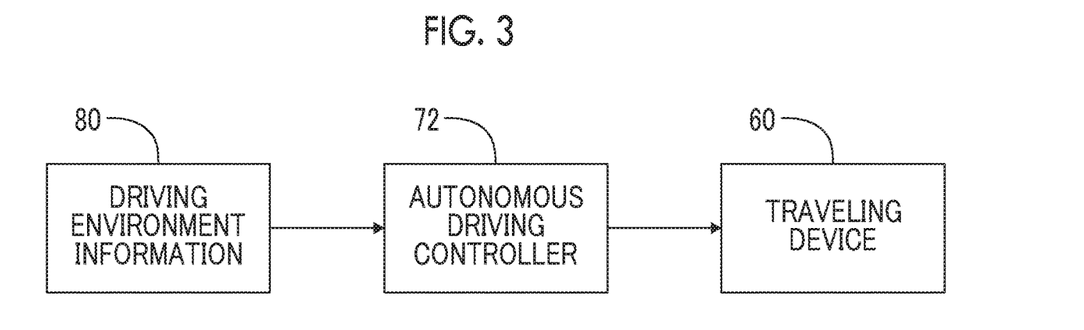
FIG. 3 is a block diagram illustrating autonomous driving control processing according to Embodiment 1.

FIG. 3 is a block diagram illustrating the autonomous driving control processing according to Embodiment 1. The controller 70 (autonomous driving controller 72) executes the autonomous driving control based on the driving environment information 80 while the autonomous driving mode is selected. The autonomous driving control that is executed in Embodiment 1 is "path-following control". In the path-following control, the autonomous driving controller 72 calculates a target path TP of the vehicle 1 and controls traveling of the vehicle 1 to follow the target path TP. Traveling of the vehicle 1 is controllable by appropriately operating the traveling device 60.

2-1. Outline of Path-Following Control

The autonomous driving controller 72 acquires information needed for the calculation of the target path TP at regular intervals. The above-described information is a part of the driving environment information 80, and includes, for example, the position-azimuth information 81, the lane information 82, the surrounding circumstance information 83, and the distribution information 85. The target path TP is updated at regular intervals based on the above-described information.

The autonomous driving controller 72 executes control for reducing a deviation between the vehicle 1 and the target path TP in order to make the vehicle 1 follow the latest target path TP. To this end, for example, parameters, such as a lateral deviation Ed, an azimuth angle difference θd, and a curvature of the target path TP, are taken into consideration. The lateral deviation Ed is the distance between the target path TP and the center of gravity of the vehicle 1. Accordingly, when the center of gravity of the vehicle 1 is on the target path TP, the lateral deviation Ed becomes zero. The azimuth angle difference θd is the difference in azimuth angle between the vehicle 1 and the target path TP.

In more detail, the autonomous driving controller 72 calculates a vehicle control amount for reducing the deviation between the vehicle 1 and the target path TP based on the parameters, such as the lateral deviation Ed, the azimuth angle difference θd, and the curvature of the target path TP. Then, the autonomous driving controller 72 operates the traveling device 60 according to the calculated vehicle control amount.

For example, the traveling device 60 includes an electric power steering (EPS) device that steers the wheels of the vehicle 1. The wheels can be steered by driving and controlling a motor of the EPS device. The autonomous driving controller 72 calculates a target steering angle needed for making the vehicle 1 follow the target path TP. The autonomous driving controller 72 acquires an actual steering angle from the vehicle state information 84. Then, the autonomous driving controller 72 calculates a motor current command value according to the difference between the actual steering angle and the target steering angle and drives the motor according to the motor current command value. In this way, the path-following control is executed.

2-2. Problem when Vehicle Operation is Handed Over to Driver

During the execution of the path-following control (autonomous driving mode), switching (a handover of a vehicle operation) from the autonomous driving mode to the manual driving mode may be performed based on the determination of the autonomous driving controller 72. An example of a situation in which a handover of a vehicle operation described above is requested is as follows. That is, a system limit due to a restriction on hardware of the vehicle control system 100 is reached, and as a result, a vehicle behavior is significantly staggered centering on the target path TP within the traveling lane compared to a vehicle behavior converged on the target path TP during the normal time. In the case described above, since the path-following control is hardly continued, the subject of driving needs to be appropriately handed over from the autonomous driving controller 72 to the driver. Then, to this end, when staggering of a vehicle behavior is actually forced to be converged with the continuation of the path-following control, appropriate determination on whether or not the path-following control is to be continued is requested such that unneeded determination that the path-following control should be interrupted is restrained.

2-3. System Limit Determination Processing According to Embodiment 1

In Embodiment 1, the autonomous driving controller 72 executes system limit determination processing described below in order to determine whether or not the path-following control is to be continued.

2-3-1. Definition of Staggering Behavior of Vehicle in System Limit

Figure 4:
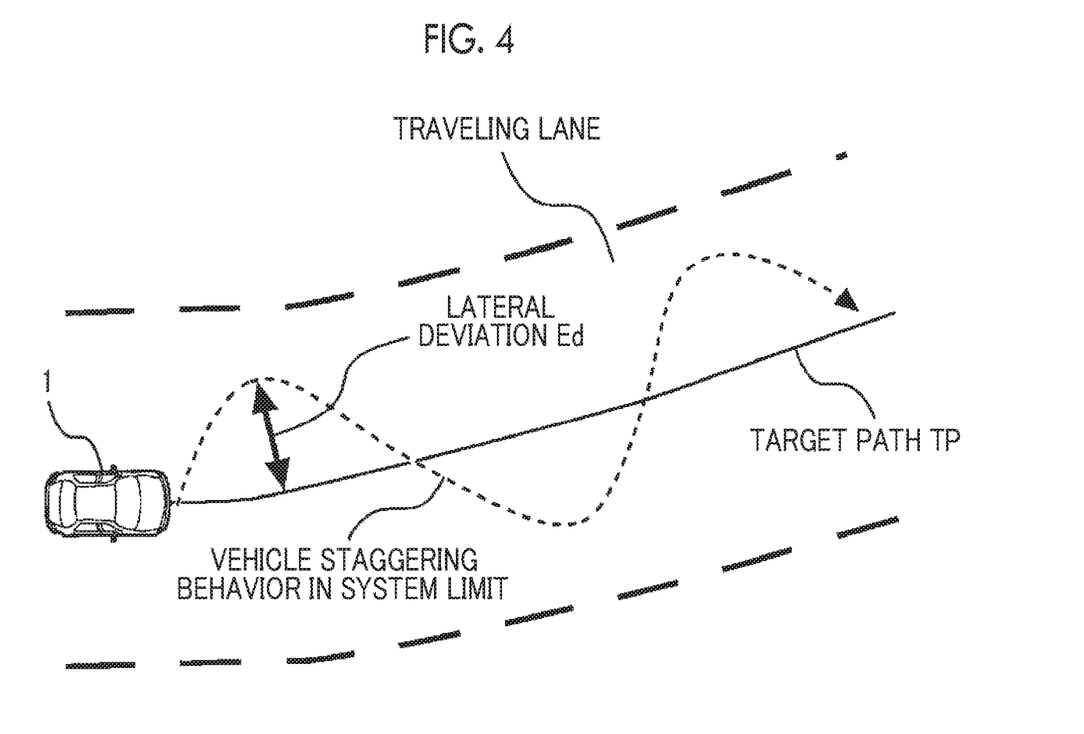
FIG. 4 is a diagram illustrating a staggering behavior of a vehicle in a system limit.

FIG. 4 is a diagram illustrating the definition of a staggering behavior of the vehicle 1 in a system limit. In FIG. 4, the staggering behavior (a broken line indicating a traveling trajectory of the vehicle 1) of the vehicle 1 in the system limit is represented by a sine wave. When the system limit due to the restriction on hardware of the vehicle control system 100 is reached during the execution of the path-following control, since the vehicle 1 is about to follow the target path TP, the vehicle 1 shows a behavior of staggering while repeatedly straddling the target path TP. For this reason, it can be said that it is valid to define the staggering behavior (hereinafter, referred to as a "staggering behavior limit") of the vehicle 1 in the system limit by a sine wave.

Figure 5:
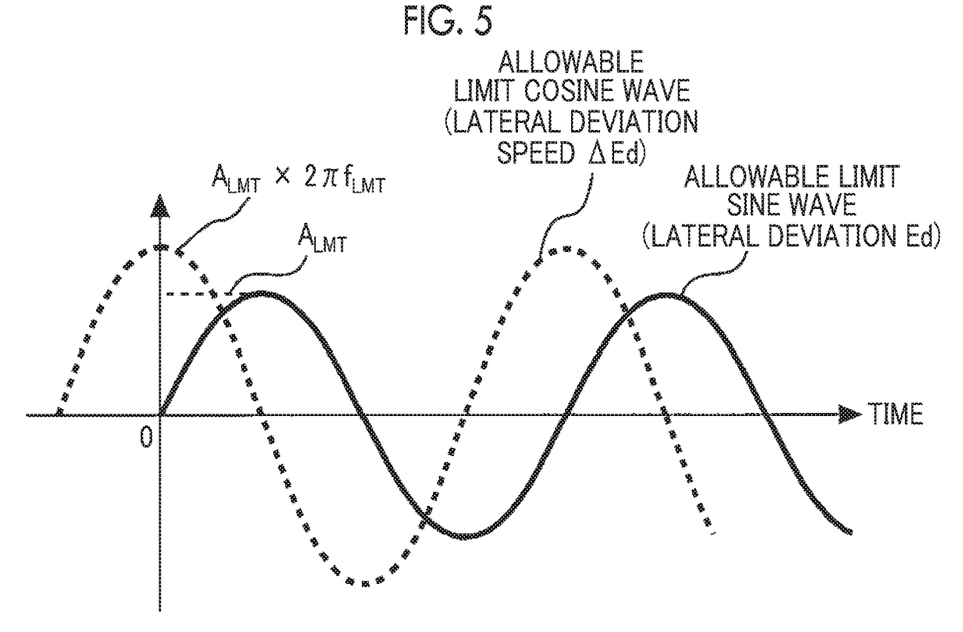
FIG. 5 is a graph showing temporal waveforms of a lateral deviation and a lateral deviation speed in a system limit.

2-3-2. Allowable Limit Sine Wave of Lateral Deviation Ed in Path-Following Control FIG. 5 is a diagram showing temporal waveforms of a lateral deviation and a lateral deviation speed in a system limit. As described above, the lateral deviation Ed is the distance (a following error with respect to the target path TP) between the target path TP and the center of gravity of the vehicle 1. For this reason, when the staggering behavior in the system limit is defined by the sine wave as shown in FIG. 4, the temporal waveform of the lateral deviation Ed in the system limit also becomes a sine wave as shown in FIG. 5.

In more detail, the sine wave of the lateral deviation Ed in the system limit is hereinafter referred to as an "allowable limit sine wave". A function (sine function) of the allowable limit sine wave is represented as Expression (1).

$$Ed = A_{LMT} \cdot \sin(2\pi f_{LMT} \cdot t) \quad (1)$$

In Expression (1), $A_{LMT}$ is amplitude (maximum amplitude) of the allowable limit sine wave, and is an allowable upper limit value of the lateral deviation Ed that can be taken in the system limit. $f_{LMT}$ is a frequency of the allowable limit sine wave, and is an allowable upper limit value of a frequency of the traveling trajectory of the vehicle 1 during the path-following control. It can be said that the amplitude $A_{LMT}$ and the frequency $f_{LMT}$ in Expression (1) correspond to an "allowable upper limit lateral deviation" and an "allowable upper limit frequency" of the lateral deviation Ed when the path-following control is executed within the system limit, respectively. Furthermore, t is a time.

A time differentiation value of the lateral deviation Ed with respect to the target path TP is hereinafter referred to as a "lateral deviation speed $\Delta Ed$". When the lateral deviation Ed in the system limit is represented by an allowable limit sine wave, the lateral deviation speed $\Delta Ed$ in the system limit is represented by a cosine wave (allowable limit cosine wave) as shown in FIG. 5. A function of the cosine wave, that is, a cosine function that is obtained by time-differentiating the function of the allowable limit sine wave is represented as Expression (2). Note that $\Delta Ed$ in Expression (2) corresponds to the horizontal axis X of FIG. 6 described below.

$$\Delta Ed = dEd/dt = A_{LMT} \cdot 2\pi f_{LMT} \cdot \cos(2\pi f_{LMT} \cdot t) \quad (2)$$

When the amplitude $A_{LMT}$ and the frequency $f_{LMT}$ are determined, the function of the allowable limit sine wave represented by the Expression (1) is specified, and in addition to this, the function (cosine function) of the allowable limit cosine wave represented by Expression (2) is also specified. A specific setting example of the amplitude $A_{LMT}$ and the frequency $f_{LMT}$ will be described below referring to FIGS. 10A, 10B to 12A, and 12B.

2-3-3. Outline of System Limit Determination Processing

As described above, when the staggering behavior in the system limit is defined by the sine wave, it is possible to specify the function of the allowable limit sine wave and to set the function of the allowable limit cosine wave by appropriately setting the amplitude A and the frequency f.

Figure 6:
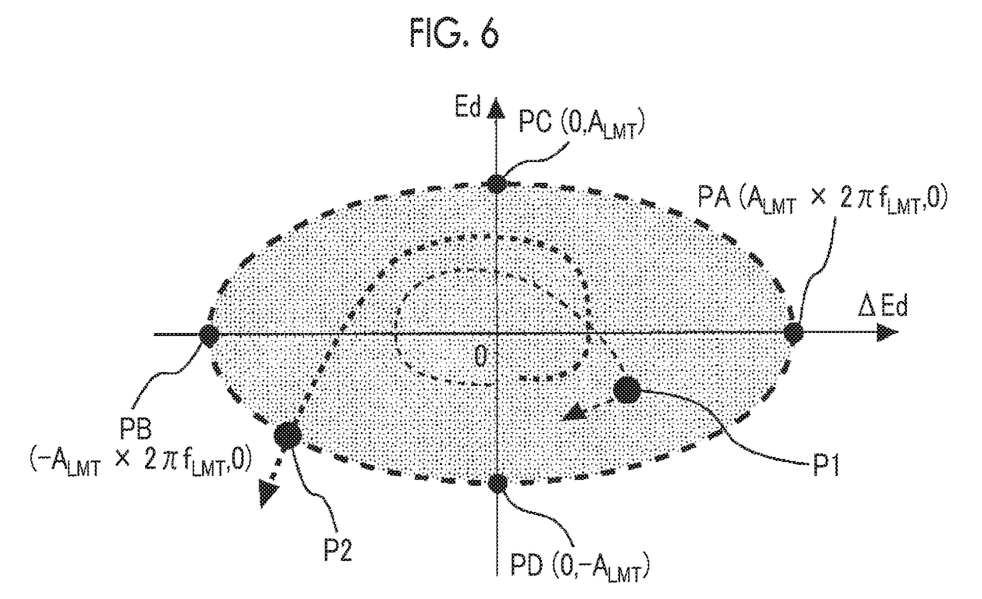

FIG. 6 is a diagram illustrating an ellipse that is used for the system limit determination processing. With time t as a parameter, a value of the function of the allowable limit cosine wave on the X axis, and a value of the function of the allowable limit sine wave on the Y axis, the system limit corresponding to the allowable limit sine wave and the allowable limit cosine wave can be expressed by an ellipse on an X-Y plane as shown in FIG. 6.

Note that an X coordinate of a point PA in FIG. 6 is a maximum value ($=A_{LMT} \times 2\pi f_{LMT}$ (positive maximum amplitude value)) of the cosine function, and an X coordinate of a point PB is a minimum value ($=-A_{LMT} \times 2\pi f_{LMT}$ (negative maximum amplitude value)) of the cosine function. A Y coordinate of a point PC is a maximum value ($=A_{LMT}$ (positive maximum amplitude value)) of the sine function, and a Y coordinate of the point PD is a minimum value ($=-A_{LMT}$ (negative maximum amplitude value)) of the sine function.

In the system limit determination processing of Embodiment 1, the ellipse is used in order to evaluate a current vehicle behavior based on the staggering behavior in the system limit. Specifically, determination is made whether or not a coordinate point P with the current lateral deviation speed $\Delta Ed$ and lateral deviation Ed of the vehicle 1 as an X coordinate and a Y coordinate falls within the ellipse.

When the current coordinate point P of the vehicle 1 falls within the ellipse, it can be said that the current vehicle behavior is stable compared to the staggering behavior in the system limit (in other words, followability to the target path TP is excellent compared to the staggering behavior in the system limit). Accordingly, while the vehicle 1 maintains a stable behavior compared to the staggering behavior in the system limit, the coordinate point P of the vehicle 1 draws a trajectory such as rotating around the origin within the ellipse illustrated in FIG. 6.

Figure 7:
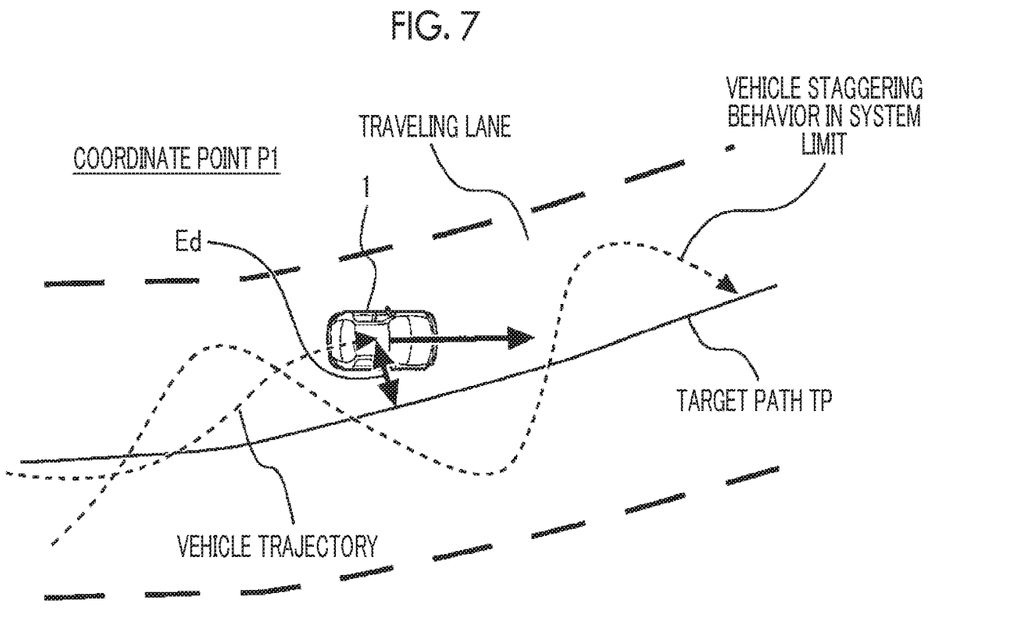
FIG. 7 is a diagram showing a behavior of a vehicle when a lateral deviation Ed and a lateral deviation speed ΔEd of a coordinate point P1 in FIG. 6 occur and a staggering behavior in a system limit in a comparative manner.

FIG. 7 is a diagram showing a behavior of the vehicle 1 when a lateral deviation Ed and a lateral deviation speed $\Delta Ed$ of a coordinate point P1 in FIG. 6 occur and the staggering behavior in the system limit in a comparative manner. The coordinate point P1 falls within the ellipse as shown in FIG. 6. For this reason, as shown in FIG. 7, a vehicle behavior corresponding to the coordinate point P1 becomes a sine wave-shaped staggering behavior (that is, a stable staggering behavior) having the amplitude A (lateral deviation Ed) and the frequency f smaller than the staggering behavior in the system limit.

When the current coordinate point P of the vehicle 1 is out of the ellipse, the current vehicle behavior is significantly staggered compared to the staggering behavior of the system limit (in more detail, at least one of the amplitude A (lateral deviation Ed) and the frequency f of the sine wave becomes large). Accordingly, in this case, it can be said that followability to the target path TP is deteriorated compared to the staggering behavior of the system limit.

Figure 8:
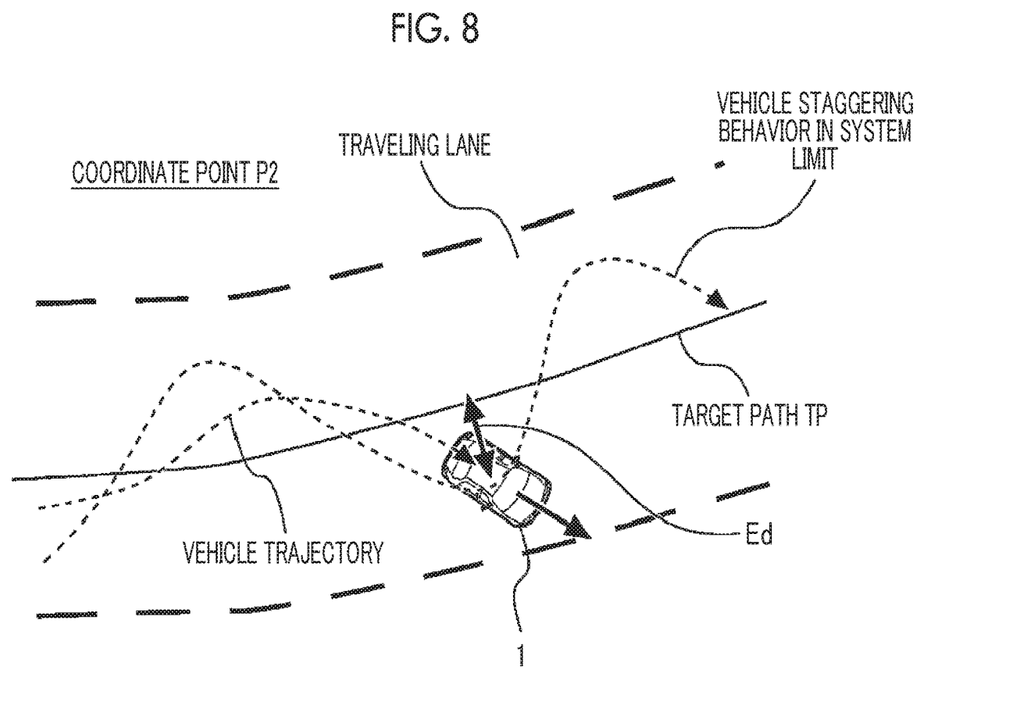
FIG. 8 is a diagram showing a behavior of a vehicle when a lateral deviation Ed and a lateral deviation speed ΔEd of a coordinate point P2 in FIG. 6 occur and a staggering behavior in a system limit in a comparative manner.

FIG. 8 is a diagram showing a behavior of the vehicle 1 when a lateral deviation Ed and a lateral deviation speed $\Delta Ed$ of a coordinate point P2 in FIG. 6 occur and the staggering behavior in the system limit in a comparative manner. The coordinate point P2 corresponds to a coordinate point P that deviates from the ellipse positively as shown in FIG. 6. For this reason, a behavior of the vehicle 1 corresponding to the coordinate point P2 corresponds to the staggering behavior when the system limit is reached. Then, as shown in FIG. 8, the vehicle 1 when the coordinate point P2 is obtained reaches the staggering behavior limit, and when any measures are not taken, the vehicle 1 deviates from the traveling lane thereafter.

Note that, in FIGS. 7 and 8, a curve representing the staggering behavior in the system limit is shown with the intention that, in FIGS. 7 and 8, an example of the staggering behavior of the vehicle 1 to be illustrated shows less staggering compared to the staggering behavior in the system limit. That is, as shown in FIGS. 7 and 8, it is not the case that the curve itself representing the staggering behavior in the system limit is drawn on the traveling lane along with the target path TP and is used for the determination of the system limit.

2-4. Alarm Processing Relating to Handover of Vehicle Operation to Driver

When the system limit determination processing is executed and determination is made that the coordinate point P falls within the ellipse, the autonomous driving controller 72 determines that the path-following control is to be continued. When determination is made that the coordinate point P is out of the ellipse, the autonomous driving controller 72 determines that the path-following control is not to be continued, and executes alarm processing on a condition that a predetermined decision condition described below is established. The alarm processing is processing for prompting the driver to perform an operation of the vehicle 1.

2-5. Routine of System Limit Determination Processing and Alarm Processing

Figure 9:
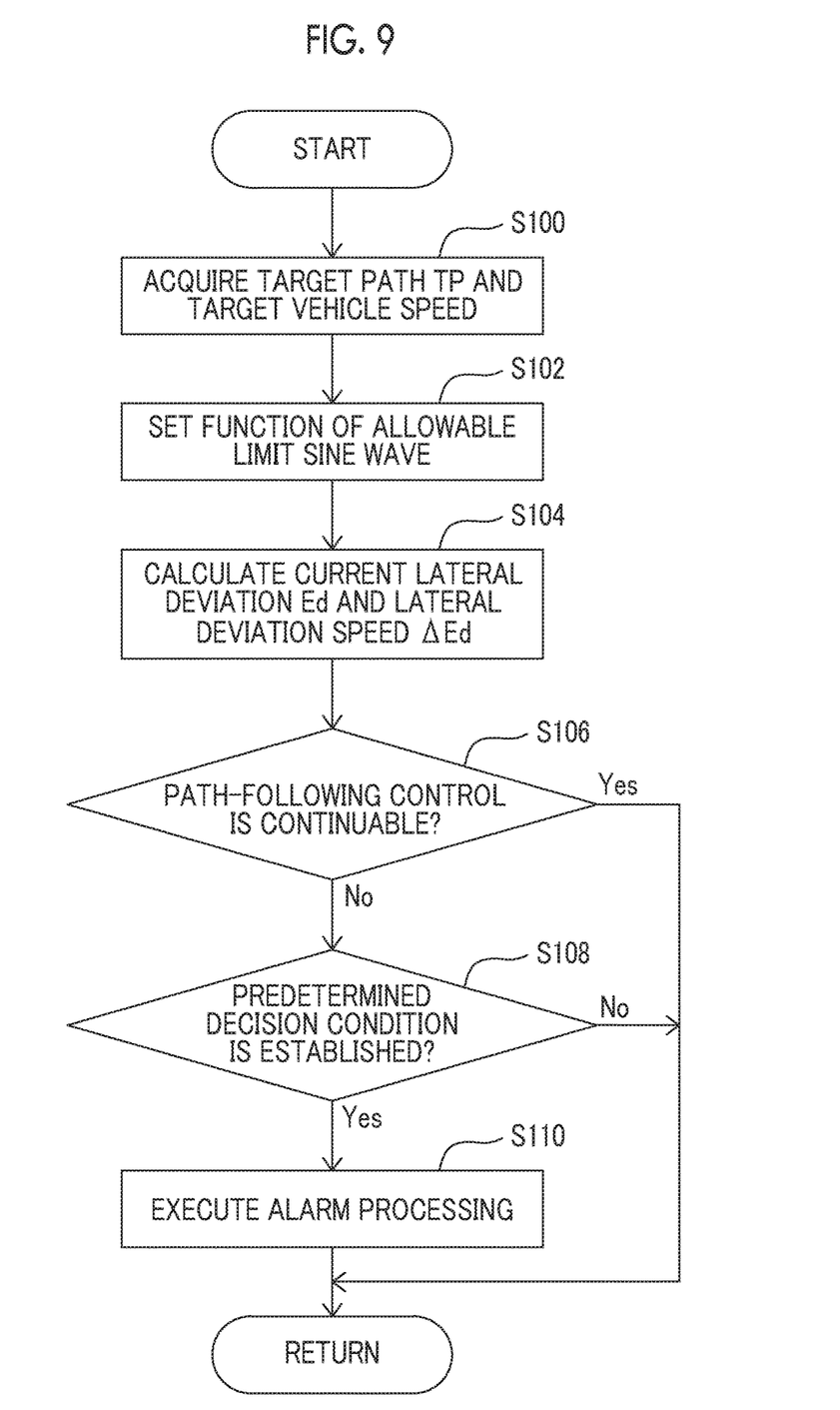
FIG. 9 is a flowchart showing a routine of the system limit determination processing and the alarm processing according to Embodiment 1.

FIG. 9 is a flowchart showing a routine of the system limit determination processing and the alarm processing according to Embodiment 1. The routine is started when the controller 70 receives an execution request of the autonomous driving mode (path-following control) from the driver based on a driver's operation of the HMI unit 90, and is executed repeatedly in a predetermined control cycle until the path-following control ends. Note that the path-following control ends when the driver operates the HMI unit 90 to cancel the execution request of the path-following control or when a handover of an operation of the vehicle 1 to the driver is performed after the autonomous driving controller 72 executes the alarm processing.

In the routine shown in FIG. 9, the autonomous driving controller 72 (controller 70) first acquires the target path TP and a target vehicle speed (Step S100). As described above, the target path TP is calculated, for example, based on the position-azimuth information 81, the lane information 82, the surrounding circumstance information 83, and the distribution information 85. Note that, as a calculation method of the target path TP, various methods are disclosed. The calculation method of the target path TP in Embodiment 1 is not particularly limited.

Specifically, as the target vehicle speed, a value set by the driver using the HMI unit 90 is used. However, the autonomous driving controller 72 may correct the target vehicle speed from the set value of the driver according to an interval between a preceding vehicle and the host vehicle 1 or based on signs or map information. Note that, unlike the vehicle control system 100, in a system where solely steering of the vehicle 1 is automated and acceleration and braking are not automated, an actual vehicle speed that is acquired by the vehicle speed sensor is used instead of the target vehicle speed.

The autonomous driving controller 72 sets the function of the allowable limit sine wave of the lateral deviation Ed corresponding to the staggering behavior in the system limit (Step S102). In more detail, the autonomous driving controller 72 acquires the latest amplitude $A_{LMT}$ and frequency $f_{LMT}$, thereby setting the sine function represented by Expression (1). With this, how much the vehicle 1 is allowed to be staggered with respect to a future traveling trajectory (that is, the target path TP) is decided. Furthermore, a certain amount of time is needed in order that the driver who receives the alarm processing after the determination of the system limit takes over the vehicle operation and deals with a current situation. The values of the amplitude $A_{LMT}$ and the frequency $f_{LMT}$ to be acquired are decided such that the determination of the system limit is performed with a margin needed for securing the time described above.

As an example, the amplitude $A_{LMT}$ and the frequency $f_{LMT}$ can be decided as follows. That is, base values of the amplitude $A_{LMT}$ and the frequency $f_{LMT}$ are decided in advance taking into consideration a hardware characteristic (kinetic characteristic) and a control characteristic (following characteristic during autonomous driving) of the vehicle 1. Then, final values of the amplitude $A_{LMT}$ and the frequency $f_{LMT}$ are decided taking into consideration the curvature of the target path TP, the vehicle speed, and alarm sensitivity according to relationships shown in FIGS. 10A, 10B to 12A, and 12B.

Figure 10A:
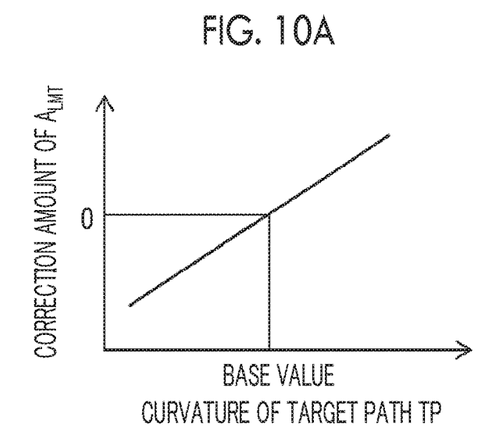
Figure 10B:
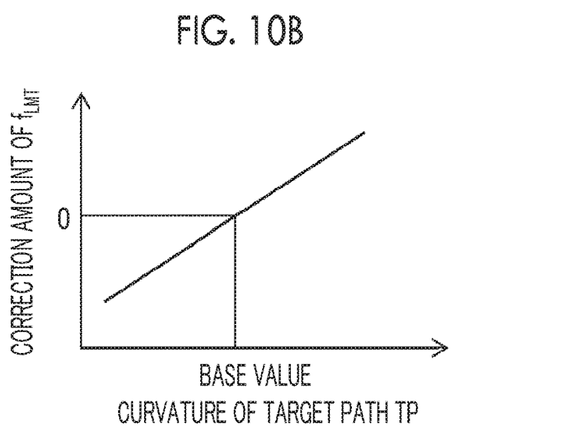

FIGS. 10A and 10B are diagrams showing examples of the relationships between correction amounts of the amplitude $A_{LMT}$ and the frequency $f_{LMT}$ and the curvature of the target path TP, respectively. The base values of the amplitude $A_{LMT}$ and the frequency $f_{LMT}$ are set to correspond to a base value of the curvature of the target path TP. In the examples shown in FIGS. 10A and 10B, when the curvature is greater than the base value, the greater the curvature, the greater the positive correction amounts of the amplitude $A_{LMT}$ and the frequency $f_{LMT}$ become. When the curvature is smaller than the base value, the smaller the curvature, the greater the negative correction amounts of the amplitude $A_{LMT}$ and the frequency $f_{LMT}$ become to the negative side.

According to the setting examples shown in FIGS. 10A and 10B, when the curvature of the target path TP is large, the amplitude $A_{LMT}$ can be made large and the frequency $f_{LMT}$ can be made high compared to when the curvature of the target path TP is small. Note that a characteristic of change in correction amount according to the curvature is not limited to the examples shown in FIGS. 10A and 10B. Instead of the above-described examples, the amplitude $A_{LMT}$ and the frequency $f_{LMT}$ may not be changed according to the curvature of the target path TP, and the base values may be used regardless of the curvature.

Figure 11A:
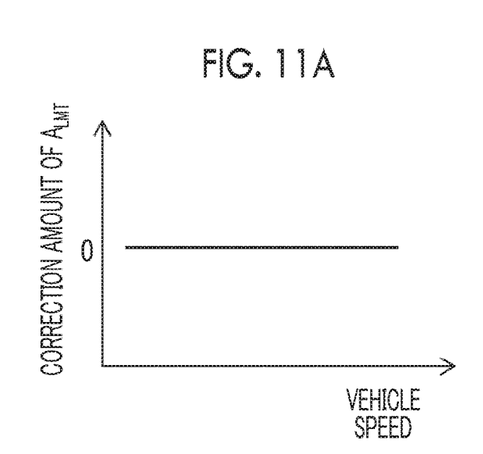
Figure 11B:
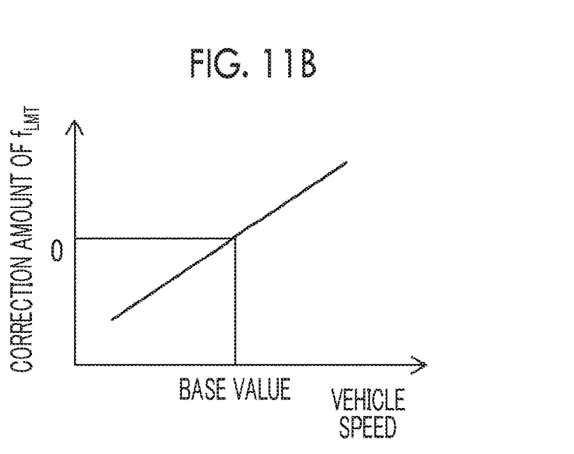

FIGS. 11A and 11B are diagrams showing examples of the relationships between the correction amounts of the amplitude $A_{LMT}$ and the frequency $f_{LMT}$ and the vehicle speed of the host vehicle 1, respectively. The vehicle speed is the target vehicle speed acquired in Step S100. Note that, unlike the vehicle control system 100, in a system where solely steering of the vehicle 1 is automated and acceleration and braking are not automated, the actual vehicle speed that is acquired by the vehicle speed sensor is used as the vehicle speed.

In the example shown in FIG. 11A, the amplitude $A_{LMT}$ is constant without depending on the vehicle speed. However, the amplitude $A_{LMT}$ may not necessarily be constant regardless of the vehicle speed, and may be appropriately changed according to the vehicle speed. For example, the amplitude $A_{LMT}$ may be smaller when the vehicle speed is high than when the vehicle speed is low. The amplitude $A_{LMT}$ may be smaller when the width of the traveling lane is small than when the width of the traveling lane is large.

The base value of the frequency $f_{LMT}$ is set to correspond to the base value of the vehicle speed. Then, in the example shown in FIG. 11B, when the vehicle speed is higher than the base value, the higher the vehicle speed, the greater the positive correction amount of the frequency $f_{LMT}$ becomes. When the vehicle speed is lower than the base value, the lower the vehicle speed, the greater the negative correction amount of the frequency $f_{LMT}$ becomes to the negative side. According to the setting example shown in FIG. 11B, the frequency $f_{LMT}$ can be made higher when the vehicle speed is high than when the vehicle speed is lower. Note that a characteristic of change in correction amount according to the vehicle speed is not limited to the example shown in FIG. 11B. Instead of the above-described example, the frequency $f_{LMT}$ may not be changed according to the vehicle speed, and the base value may be used regardless of the vehicle speed.

Figure 12A:
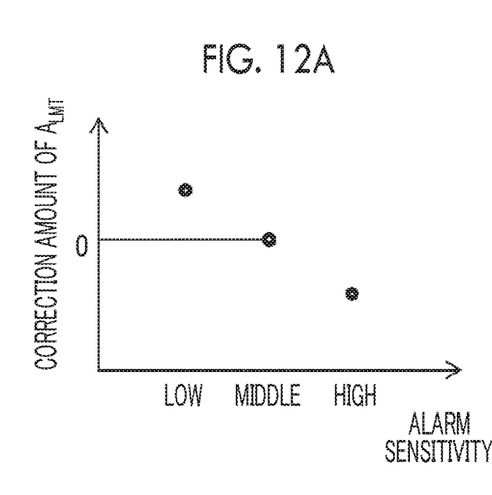
Figure 12B:
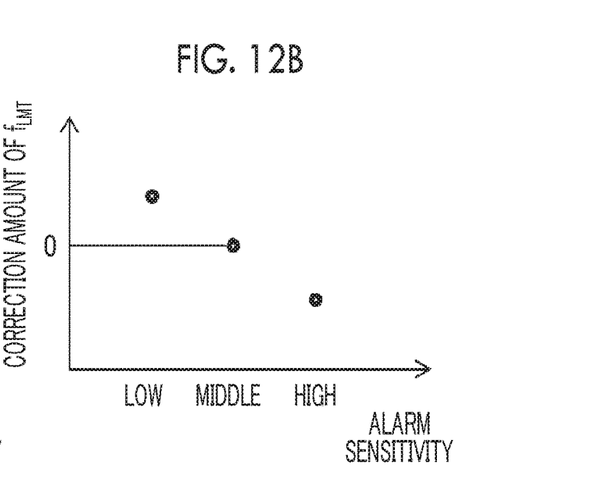

FIGS. 12A and 12B are diagrams showing examples of the relationships between the correction amounts of the amplitude $A_{LMT}$ and the frequency $f_{LMT}$ and alarm sensitivity, respectively. When alarm sensitivity requested by the driver is relatively high, this means that the system limit is determined to be reached in a state in which the staggering behavior of the vehicle 1 is relatively small and an alarm is executed.

The base values of the amplitude $A_{LMT}$ and the frequency $f_{LMT}$ are set to correspond to a value of alarm sensitivity of a middle level. In the examples shown in FIGS. 12A and 12B, when the alarm sensitivity is at a low level, the positive correction amounts of the amplitude $A_{LMT}$ and the frequency $f_{LMT}$ are used. When the alarm sensitivity is at a high level, the negative correction amounts of the amplitude $A_{LMT}$ and the frequency $f_{LMT}$ are used.

According to the setting examples shown in FIGS. 12A and 12B, the amplitude $A_{LMT}$ can be made lower and the frequency $f_{LMT}$ can be made lower when the alarm sensitivity is high than when the alarm sensitivity is low.

The autonomous driving controller 72 calculates current lateral deviation Ed and lateral deviation speed ΔEd (Step S104). The current lateral deviation Ed can be calculated based on the target path TP acquired in Step S100 and the latest position-azimuth information 81. The current lateral deviation speed ΔEd is calculated using the difference between a present value of the lateral deviation Ed to be calculated in cycles and a previous value of the lateral deviation Ed. Note that, instead of the above-described method, the lateral deviation speed ΔEd may be calculated by multiplying the azimuth angle difference θd from the target path TP by the current vehicle speed.

The autonomous driving controller 72 executes the system limit determination processing for determining whether or not the path-following control is to be continued (Step S106). The ellipse (see FIG. 6) that is used in the system limit determination processing is specified using the function of the allowable limit sine wave set in Step S102 and the cosine function that is obtained by time-differentiating the function of the allowable limit sine wave.

In Step S106, when determination is made that the coordinate point P the current lateral deviation speed ΔEd and lateral deviation Ed of the vehicle 1 as the X coordinate and the Y coordinate, respectively, falls within the ellipse, the behavior of the vehicle 1 is stable compared to the staggering behavior in the system limit, and determination can be made that the system limit is not reached. For this reason, in this case, the autonomous driving controller 72 determines that the path-following control is to be continued, and ends the processing of the routine at the time of the present start quickly.

In Step S106, when determination is made that the current coordinate point P of the vehicle 1 is out of the ellipse, determination can be made that the vehicle 1 reaches the staggering behavior limit, that is, the system limit is reached. In this case, the autonomous driving controller 72 determines that the path-following control is not to be continued, and progresses to processing of Step S108.

In Step S108, the autonomous driving controller 72 determines whether or not the predetermined decision condition for securing the determination that the system limit is reached is established through the processing of Step S106. Not only the processing of Step S106 is executed, but also the determination of the system limit is decided with establishment of the decision condition, whereby it is possible to more appropriately specify a situation in which determination should be made that the system limit is reached.

As the decision condition, the following specific examples are exemplified. One of the specific examples refers to a case where the path-following control is being executed (in more detail, while the path-following control based on the driver's operation of the HMI unit 90 is starting or is not ending). In addition, while the path-following control is starting (in a transition period from a state in which there is no path-following control to a state in which there is the path-following control), the vehicle 1 may be moved promptly in order to make the position of the vehicle 1 converge on the target path TP. For this reason, a determination result is not decided while the path-following control is started, whereby it is possible to restrain careless determination that the system limit is reached when a low frequency value is used as the frequency $f_{LMT}$ of the allowable limit sine wave. While the path-following control is ending (in a transition period from the state in which there is the path-following control to the state in which there is no path-following control), since the path-following control ends before a handover of an operation of the vehicle 1 to the driver is completed with determination that the system limit is reached, even in this case, the decision of the determination result is not performed.

Another specific example of the decision condition refers to a case where there is no operation of the steering wheel (when hands are released from the steering wheel). When the driver holds the steering wheel, a following error (lateral deviation Ed) with respect to the target path TP due to steering by the driver is generated. In the example of the processing shown in FIG. 9, in this case, the decision is not performed. In more detail, when the vehicle 1 moves in a direction of an adjacent lane with steering by the driver, since there is a possibility of lane change, the decision is not performed. However, even though the driver holds the steering wheel, when there is no adjacent lane in a steering direction, the decision may be performed.

A further specific example of the decision condition refers to a case where one of a condition that no abnormality occurs in the vehicle control system 100, a condition that there is no operation of the brake pedal, a condition that there is no operation of the accelerator pedal, and a condition that the vehicle speed is within a predetermined range, or a plurality of conditions is established. In addition, when the occurrence of some abnormality in the vehicle control system 100 is detected through predetermined abnormality determination processing that is executed separately, the vehicle 1 may be hardly made to follow the target path TP at all. For this reason, in this case, the decision is not performed. When an operation of the brake pedal or the accelerator pedal is performed, similarly to when an operation of the steering wheel is performed, since a following error (lateral deviation Ed) with respect to the target path TP due to a driver's operation is generated, the decision is not performed. When the vehicle speed is out of a predetermined range toward a low speed side (for example, when the vehicle 1 is about to be stopped or at the time of a very low speed), since the following error is hardly quickly corrected, the decision may not be performed. Even when the vehicle speed is out of the predetermined range toward a high speed side, the decision may not be performed.

Note that, in the processing of Step S108, in order to restrain the determination result of the system limit from being hunted, the determination result may not be decided when a predetermined time has not elapsed or the determination result may be held for a predetermined time after the decision. The determination of the presence or absence of establishment of the decision condition through the processing of Step S108 may be performed earlier than Step S100, instead of the example shown in FIG. 9. Accordingly, when the decision condition is established, the processing of Steps S100 to S106, and S110 may be executed.

The autonomous driving controller 72 ends the processing of the routine at the time of the present start quickly when the determination result of Step S108 is negative. That is, in this case, even when determination is made that the path-following control is not to be continued, the determination is not decided.

When the determination result of Step S108 is affirmative, the autonomous driving controller 72 decides determination that the path-following control is not to be continued, and next, the information notification unit 74 executes the alarm processing in order to prompt the driver to perform an operation of the vehicle 1 (Step S110). The alarm processing can be executed, for example, by notifying the driver of text information, an image, voice, or sound effect using the HMI unit 90.

3. Effects of Embodiment 1

As described above, in the system limit determination processing according to Embodiment 1, the ellipse that is represented on the X-Y plane based on the function of the allowable limit sine wave of the lateral deviation Ed and the function of the allowable limit cosine wave of the lateral deviation speed ΔEd to be obtained by time-differentiating the function of the allowable limit sine wave is used as the boundary for determining that the staggering behavior of the vehicle 1 falls within the system limit. Then, when the coordinate point P that is specified by the current lateral deviation Ed and lateral deviation speed ΔEd falls within the ellipse, since the staggering behavior is within the system limit (that is, the staggering behavior of the vehicle 1 is controlled in a stable state within the system limit), determination is made that the path-following control is to be continued. When the coordinate point P is out of the ellipse, since the staggering behavior exceeds the system limit, determination is made that the path-following control is not to be continued.

In more detail, it can be said that the lateral deviation Ed of the vehicle 1 from the target path TP being defined by the allowable limit sine wave is the same as the staggering behavior of the vehicle 1 based on the target path TP in the system limit being defined by the sine wave. For this reason, for example, even when the coordinate point P is moving such that both of the lateral deviation Ed and the lateral deviation speed ΔEd increase, the vehicle 1 follows the sine wave-shaped traveling trajectory and the lateral deviation Ed turns to decline in the future because the vehicle behavior is within the allowable limit of the staggering behavior insofar as the coordinate point P falls within the ellipse. That is, according to the system limit determination processing, it is possible to more accurately distinguish between the staggering behavior of the vehicle 1 when the system limit is reached and a behavior that staggering (lateral deviation Ed) converges (a behavior when the vehicle 1 follows the target path TP normally). In other words, it is possible to further suppress erroneous determination that a behavior that staggering should actually converge through the path-following control reaches the system limit.

In addition, with the vehicle control system 100 according to Embodiment 1, when the coordinate point P is out of the ellipse, determination is made that the path-following control is not to be continued, and the alarm processing for prompting the driver to perform an operation of the vehicle 1 is executed. As described above, the values of the amplitude $A_{LMT}$ and the frequency $f_{LMT}$ that are acquired for deicing the allowable limit sine wave are decided such that the determination of the system limit can be performed with a margin needed for securing the time for which the driver takes over a vehicle operation and deals with a current situation. For this reason, according to Embodiment 1, since the time is secured when a vehicle operation is handed over to the driver, the determination of the system limit (a situation in which a vehicle operation should be handed over) and the alarm can be appropriately performed.

Effects Relating to Setting of Amplitude $A_{LMT}$ and Frequency $f_{LMT}$

With the system limit determination processing according to Embodiment 1, the amplitude $A_{LMT}$ is changed according to the curvature of the target path TP and the alarm sensitivity, and the frequency $f_{LMT}$ is changed according to the curvature of the target path TP, the vehicle speed, and the alarm sensitivity. With this, it is possible to appropriately determine the system limit of the vehicle behavior taking into consideration the curvature of the target path TP and the vehicle speed. Furthermore, it is possible to appropriately set the amplitude $A_{LMT}$ and the frequency $f_{LMT}$ so as to satisfactorily satisfy a driver's request for alarm sensitivity.

In more detail, the vehicle 1 shows a behavior of following the target path TP while being accompanied by the greater lateral deviation Ed when the curvature of the target path TP is large than when the curvature of the target path TP is small (that is, when the traveling lane is nearly a straight line). With the use of the setting shown in FIG. 10A, when the curvature is large, the amplitude $A_{LMT}$ (allowable upper limit lateral deviation) is made large, whereby it is possible to secure greater amplitude of a behavior within the system limit. The vehicle behavior may be controlled at a higher change speed (that is, at a higher frequency f) for convergence on the target path TP when the curvature is large than when the curvature is small. In regard to this, with the use of the setting shown in FIG. 10B, when the curvature is large, the allowable upper limit frequency $f_{LMT}$ is made high, whereby it is possible to allow the frequency f of a behavior within the system limit to a higher value. For this reason, according to the settings shown in FIGS. 10A and 10B, it is possible to appropriately determine the system limit of the vehicle behavior according to the curvature.

According to the setting shown in FIG. 11A, the amplitude $A_{LMT}$ is constant without depending on the vehicle speed. In general, when the vehicle travels at a high speed, it can be said that the traveling lane is nearly a straight line (the curvature of the traveling lane becomes small). For this reason, at the time of high-speed traveling, it can be said that the lateral deviation Ed that occurs during the execution of the path-following control often becomes small. Accordingly, in regard to the vehicle speed, it can be said that it is valid to set the amplitude $A_{LMT}$ to a fixed value. When the vehicle speed becomes high, a speed component in a direction perpendicular to the target path TP when the vehicle 1 is separated from the target path TP at a certain angle becomes large. For this reason, the frequency f of the vehicle behavior when the vehicle 1 follows the target path TP becomes high. With the use of the setting shown in FIG. 11B, when the vehicle speed is high, the allowable upper limit frequency $f_{LMT}$ is made high, whereby it is possible to allow the frequency f of a behavior within the system limit to a higher value. For this reason, it is possible to appropriately determine the system limit of the vehicle behavior according to the vehicle speed.

According to the setting examples shown in FIGS. 12A and 12B, it is possible to make the amplitude $A_{LMT}$ lower and the frequency $f_{LMT}$ lower when the alarm sensitivity is high than when the alarm sensitivity is low. With this, when the alarm sensitivity requested by the driver is high, it is possible to determine that the system limit is reached in a state in which the staggering behavior of the vehicle 1 is relatively small and to execute the alarm relatively rapidly.

Embodiment 2

Embodiment 2 of the disclosure will be described referring to FIG. 13. In the following description, it is assumed that the configuration of the vehicle control system 100 described above is used as an example of the configuration of a vehicle control system according to Embodiment 2.

1. Outline of Embodiment 2

Embodiment 2 is different from Embodiment 1 in system limit determination processing for determining whether or not the path-following control is to be continued. Specifically, in the system limit determination processing of Embodiment 2, in order to determine whether or not the behavior of the vehicle 1 is within the system limit, a speed range $R_{\Delta Ed}$ that is defined by the maximum value $(=A_{LMT} \times 2\pi f_{LMT})$ and the minimum value $(=-A_{LMT} \times 2\pi f_{LMT})$ of the cosine function corresponding to a function of a gradient of the allowable limit sine wave is used instead of the ellipse shown in FIG. 6.

In addition, with the system limit determination processing according to Embodiment 2, determination is made whether or not the lateral deviation speed $\Delta Ed$ of the vehicle 1 when the vehicle 1 intersects the target path TP (that is, when the lateral deviation Ed is zero) falls within the speed range $R_{\Delta Ed}$. Then, when the lateral deviation speed $\Delta Ed$ when the vehicle 1 intersects the target path TP falls within the speed range $R_{\Delta Ed}$, determination is made that the behavior of the vehicle 1 is within the system limit, and the path-following control is continued. When the lateral deviation speed $\Delta Ed$ when the vehicle 1 intersects the target path TP is out of the speed range $R_{\Delta Ed}$, determination is made that the path-following control is not to be continued since the behavior of the vehicle 1 exceeds the system limit, and the alarm processing for handing over a vehicle operation to the driver is executed.

1-1. Routine of System Limit Determination Processing and Alarm Processing

Figure 13:
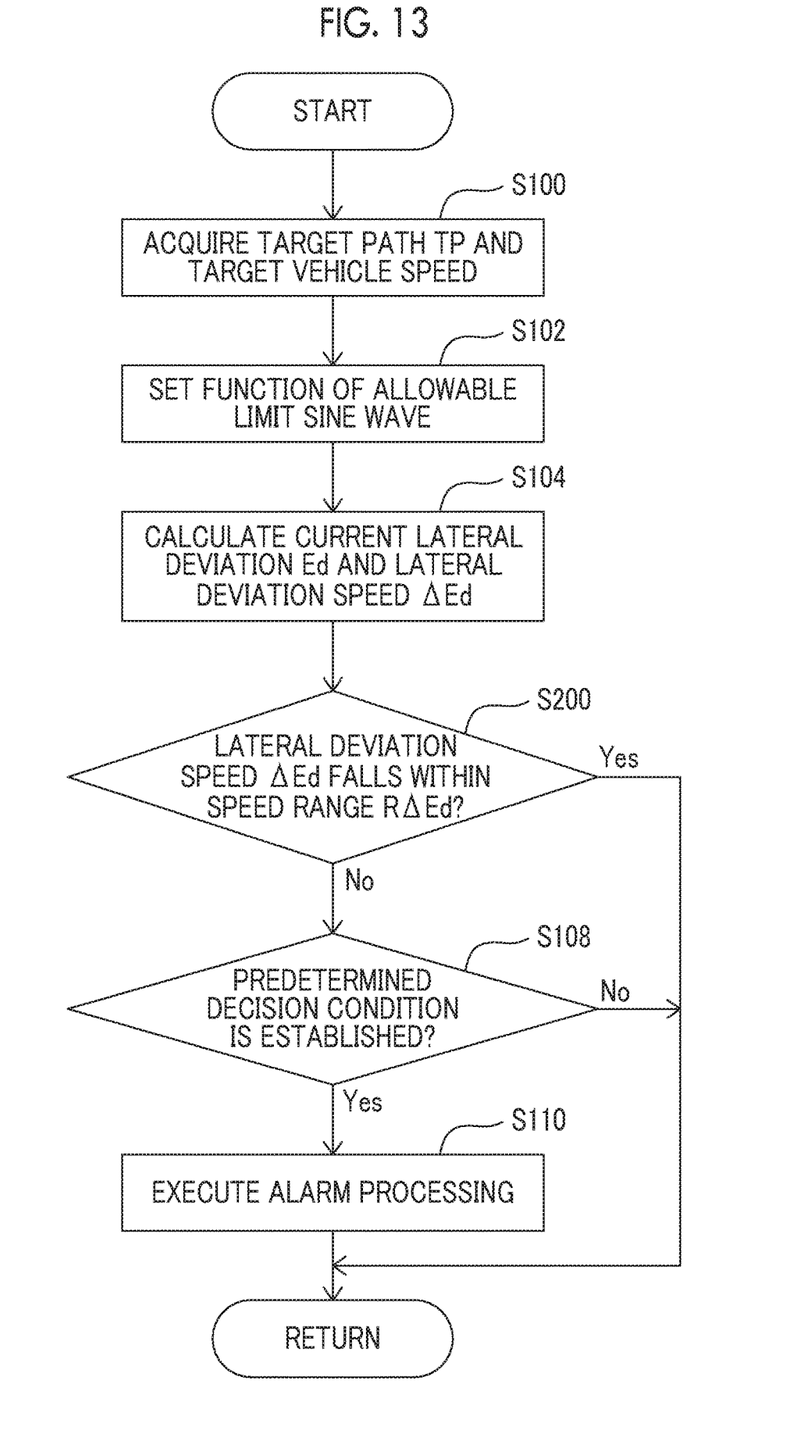
FIG. 13 is a flowchart showing a routine of system limit determination processing and alarm processing according to Embodiment 2.

FIG. 13 is a flowchart showing a routine of system limit determination processing and alarm processing according to Embodiment 2. Processing of Steps S100 to S104, S108, and S110 in the routine shown in FIG. 13 are as described in Embodiment 1.

In the routine shown in FIG. 13, the autonomous driving controller 72 calculates the current lateral deviation Ed and lateral deviation speed $\Delta Ed$ in Step S104, and then, progresses to Step S200. In Step S200, the autonomous driving controller 72 determines whether or not the time at which the vehicle 1 intersects the target path TP is reached, and the current (latest) lateral deviation speed $\Delta Ed$ calculated in Step S104 falls within the speed range $R_{\Delta Ed}$.

The speed range $R_{\Delta Ed}$ used in the determination is specified by the maximum value $(=A_{LMT} \times 2\pi f_{LMT})$ that is equal to the amplitude of the cosine function to be obtained by differentiating the function of the latest allowable limit sine wave set in Step S102 and the minimum value $(=-A_{LMT} \times 2\pi f_{LMT})$ obtained by inverting the sign of the maximum value. For example, in an example of the allowable limit sine wave $(1 \times \sin(2 \times \pi \times 0.5)t)$ where the amplitude $A_{LMT}$ (allowable upper limit lateral deviation) is 1 and the allowable upper limit frequency $f_{LMT}$ is 0.5, the maximum value of the cosine function corresponding to the maximum value of the gradient of the allowable limit sine wave becomes $1\pi (=1 \times (2 \times \pi \times 0.5))$.

When determination is made in Step S200 that the lateral deviation speed $\Delta Ed$ when the vehicle 1 intersects the target path TP falls within the speed range $R_{\Delta Ed}$, that is, when determination can be made that the path-following control is to be continued since the behavior of the vehicle 1 is within the system limit, the autonomous driving controller 72 ends the processing of the routine at the time of the present start quickly.

When determination is made in Step S200 that the lateral deviation speed $\Delta Ed$ when the vehicle 1 intersects the target path TP is out of the speed range $R_{\Delta Ed}$, that is, when determination can be made that the system limit of the staggering behavior of the vehicle 1 is reached, the autonomous driving controller 72 determines that the path-following control is not to be continued and executes the alarm processing (Step S110).

2. Effects of Embodiment 2

As described above, with the vehicle control system 100 according to Embodiment 2, the speed range $R_{\Delta Ed}$ that is defined by the maximum value and the minimum value of the cosine function corresponding to the function of the gradient of the allowable limit sine wave is used as the boundary (threshold) for determining that the staggering behavior of the vehicle 1 falls within the system limit.

As in Embodiments 1 and 2 of the disclosure, when the staggering behavior of the vehicle 1 is defined by the sine wave based on the target path TP, it can be said that the strictest condition (the most important condition in determining the system limit) in the determination of the system limit is obtained when an absolute value of the lateral deviation speed $\Delta Ed$ becomes maximum (the coordinate points PA and PB on the ellipse of FIG. 6). In other words, in view of the allowable limit sine wave, the time when the absolute value of the lateral deviation speed $\Delta Ed$ becomes maximum corresponds to the time when the traveling trajectory of the vehicle 1 intersects the target path TP (when the lateral deviation Ed is zero). Then, the reason that the strictest condition is obtained at this time is because the vehicle 1 is highly likely to maintain the large speed component and to exceed the staggering behavior limit when a high lateral deviation speed $\Delta Ed$ occurs when the traveling trajectory intersects the target path TP (that is, when the speed component of the vehicle 1 in a direction perpendicular to the target path TP is large). In other words, on an assumption that the vehicle 1 is staggered at a constant speed, when the absolute value of the lateral deviation speed $\Delta Ed$ when the vehicle 1 intersects the target path TP is smaller than the maximum value of the cosine function, it can be said that, when a subsequent traveling trajectory straddles the sine wave, the lateral deviation Ed does not become greater than the allowable limit sine wave (that is, the system limit is not exceeded).

Accordingly, with the system limit determination processing according to Embodiment 2, on the assumption that the vehicle 1 staggers at a constant speed, the system limit can be simply determined merely by comparing the lateral deviation speed ΔEd when the vehicle 1 intersects the target path TP with the speed range $R_{\Delta Ed}$ using two points of the maximum value and the minimum value of the cosine function. For this reason, compared to the system limit determination processing of Embodiment 1, since a calculation load of the controller 70 is suppressed to be low, it is possible to perform system limit determination while achieving saving of calculation resources.

As described above, the system limit determination processing according to Embodiment 2 is performed focusing on the strictest condition in the determination of the system limit on an assumption that the staggering behavior of the vehicle 1 is defined by the sine wave based on the target path TP. As described above, since determination taking into consideration that the vehicle 1 shows the sine wave-shaped staggering behavior is performed even through the determination processing, it can be said that it is possible to appropriately distinguish between the staggering behavior of the vehicle 1 when the system limit is reached and the behavior that staggering (lateral deviation Ed) converges (the behavior when the vehicle 1 follows the target path TP normally) even through the system limit determination processing. Furthermore, even with the Embodiment 2, since the above-described time is secured when a vehicle operation is handed over to the driver, it is possible to appropriately perform the determination of the system limit (a situation in which a vehicle operation should be handed over) and the alarm.

Other Embodiments

Other Examples of Path-Following Control

In Embodiments 1 and 2 described above, the vehicle control system 100 that is an autonomous driving system for automatically performing steering, acceleration, and braking of the vehicle has been exemplified. However, the vehicle control system according to the aspect of the disclosure may be a system where at least one of acceleration and braking of the vehicle is not automatically performed insofar as the path-following control for controlling traveling of the vehicle to follow the target path is executed. That is, at least braking among steering, acceleration, and braking of the vehicle may be automatically performed.

The path-following control according to the aspect of the disclosure is not necessarily executed by the autonomous driving system insofar as traveling of the vehicle is controlled to follow the target path. That is, the path-following control may be executed in order to allow the vehicle control system assists steering to be subjectively performed by the driver.

The embodiments and the modification examples described above may be combined in other ways than those explicitly described above as needed and may be modified in various ways without departing from the scope of the disclosure.

What is claimed is:

1. A vehicle control system that executes path-following control for controlling traveling of a vehicle to follow a target path, the vehicle control system comprising a controller configured to:

determine whether or not the path-following control is to be continued based on whether or not a lateral deviation speed of the vehicle when the vehicle intersects the target path falls within a speed range between a maximum value and a minimum value of a cosine function that is a time-differentiation of a function of an allowable limit sine wave, wherein the lateral deviation speed is a time differentiation value of a lateral deviation of the vehicle with respect to the target path, an amplitude is an allowable upper limit lateral deviation during the path-following control, and the allowable limit sine wave is a sine wave of an allowable upper limit frequency of a traveling trajectory of the vehicle during the path-following, or determine whether or not the path-following control is to be continued based on whether or not a coordinate point with a current lateral deviation speed and a current lateral deviation as an X axis coordinate and a Y axis coordinate, respectively, on an X-Y plane is positioned within an ellipse on the X-Y plane with a time as a parameter, a value of the cosine function as the X axis coordinate, and a value of the function of the allowable limit sine wave as the Y axis coordinate.

2. The vehicle control system according to claim 1, wherein the controller is configured to, when the lateral deviation speed of the vehicle when the vehicle intersects the target path is outside of the speed range between the maximum value and the minimum value of the cosine function or when the coordinate point is positioned outside of the ellipse on the X-Y plane, execute alarm processing for prompting a driver to perform an operation of the vehicle.

3. The vehicle control system according to claim 2, wherein the allowable upper limit lateral deviation is smaller when alarm sensitivity of the alarm processing is high than when the alarm sensitivity is low, the alarm sensitivity being requested by the driver.

4. The vehicle control system according to claim 2, wherein the allowable upper limit frequency is lower when alarm sensitivity of the alarm processing is high than when the alarm sensitivity is low, the alarm sensitivity being requested by the driver.

5. The vehicle control system according to claim 1, wherein the allowable upper limit lateral deviation is greater when a curvature of the target path is large than when the curvature is small.

6. The vehicle control system according to claim 1, wherein the allowable upper limit frequency is greater when a curvature of the target path is large than when the curvature is small.

7. The vehicle control system according to claim 1, wherein the allowable upper limit lateral deviation is constant regardless of a vehicle speed of the vehicle.

8. The vehicle control system according to claim 1, wherein the allowable upper limit frequency is higher when a vehicle speed of the vehicle is high than when the vehicle speed is low.

* * * * *